March 3, 1959   W. W. TUFFORD ET AL   2,875,927
METERING VALVE
Filed Sept. 6, 1955

INVENTORS.
WALTER W. TUFFORD
LLOYD E. THOMAS
BY THEIR ATTORNEYS.
HARRIS, KIECH, FOSTER & HARRIS

United States Patent Office 2,875,927
Patented Mar. 3, 1959

2,875,927

METERING VALVE

Walter W. Tufford, San Diego, and Lloyd E. Thomas, Lemon Grove, Calif.; said Thomas, assignor to said Tufford Application September 6, 1955, Serial No. 532,495

9 Claims. (Cl. 222—144)

This invention relates to metering valves, and more particularly, to a metering valve adapted for use with a drink vending machine wherein any one of a plurality of different drinks may be dispensed from a single station.

It is desirable in drink vending machines to provide the customer with a variety of choices, such as coffee with or without cream and/or sugar, tea, and hot soup. In machines of this type, a powder is placed in a disposable cup which is then filled with hot water, the customer removing the filled cup from the machine at the end of the filling operation. There is one cup supply mechanism and one hot water source; however, a plurality of powder sources are provided, the particular powder source utilized being selected by the customer. It is an object of this invention to provide a metering valve for use with each of the powder sources in a dispensing machine to measure out the proper amount of powder for the particular drink desired. One of the measuring portions of the valve will be associated with each powder source, the actuating portion of the valve being fixed at the dispensing station to actuate the valve and allow the powder to drop into the drinking cup.

The amount of powder required in each type of drink will vary. Accordingly it is an object of the invention to provide a metering valve in which the volume of the measuring container can be varied by the substitution of various lining sleeves.

Another object of the invention is to provide a metering valve having two closing mechanisms, the inlet side being normally open and the outlet side being normally closed, the operation of the valve closing the inlet and maintaining it closed while the outlet is opened and closed, thereby discharging a predetermined amount of powder. A further object of the invention is to provide an actuator for a metering valve which performs a plurality of open and close operations, the actuator being composed of two elements pivotally assembled.

The invention also comprises novel details of construction and novel combinations and arrangements of parts which will more fully appear in the course of the following description. However, the drawings merely show and the description merely describes a preferred embodiment of the invention as applied to a drink dispenser which is given by way of ilustration or example.

Figure 1:
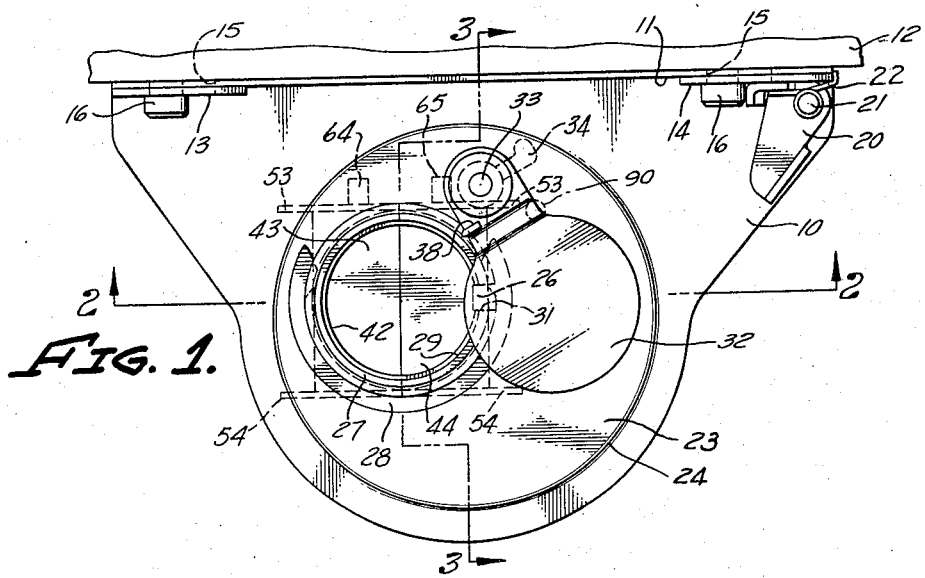
Fig. 1 is a plan view of a preferred embodiment of the invention showing the valve mounted in a dispensing machine.

The invention includes a frame 10 having an upwardly extending flange 11 which is adapted to be mounted on a roasting wheel member 12 of a dispensing machine or the like. Reinforcing plates 13 and 14 are attached to opposing ends of the flange 11, a keyhole-shaped opening 15 being provided in each reinforcing plate 13—14 and the flange portion 11 adjacent thereto. Two mounting studs 16 project from the wheel member 12. The frame 10 is mounted on the wheel member 12 by engaging the studs 16 in the openings 15, the frame 10 being locked in place by a lever 20 which is pivotally mounted on a post 21 extending upward from the frame 10. The lever 20 is urged into the locking position shown in Fig. 1 by a coil spring 22 wrapped around the post 21.

The frame 10 has a raised portion 23 with a circular flange 24. An opening 25 which is circular except for a tongue portion 26 is provided in the portion 23. A metering container or cup 27 is placed in the opening 25 from below and locked in position by a lock ring 28, the tongue 26 engaging a slot 31 in the wall of the cup 27. The cup 27 is positioned so that its upper opening 29 is disposed within an upturned bottle-like container 30 mounted on the flange 24. The outline of the bottle 30 is shown in phantom in Fig. 2.

A lid or upper closure 32 is provided to prevent the flow of material from the container 30 into the cup 27, the lid 32 being mounted on a pivot post 33 which is provided with an L-shaped arm member 34. The horizontal leg of arm 34 is secured rigidly to post 33 for rotation therewith and the vertical leg thereof depends from post 33 within the path of travel of a lever 81, hereinafter more fully described. The pivot post 33 is mounted in a boss 35 extending through the frame 10, a spring 36 surrounding the boss 35. One end of the spring 36 engages the frame 10 in an opening 37 and the other end of the spring 36 has a hook portion 38 which engages the lid 32. The spring 36 urges the lid 32 in a counterclockwise direction, as viewed in Fig. 1, so that the upper opening 29 of the cup 27 is normally open, with the passage between the container 30 and the cup 27 being unobstructed. The lid 32 is moved into position over the opening 29 by rotation of the pivot post 33, which may be accomplished by lever 81 applying a horizontal force to the vertical leg of the arm 34 to swing such leg from the full line position of Figs. 2 and 3 and the dotted line position of Fig. 1, away from frame 74, to the position shown in phantom in Fig. 2.

The bottom opening 42 of the cup 27 is closed by a pair of counterrotating bottom members 43, 44. The construction and operation of the bottom members 43 and 44 are essentially identical, the following description being applicable to each of the members 43—44.

Figures 3, 4:
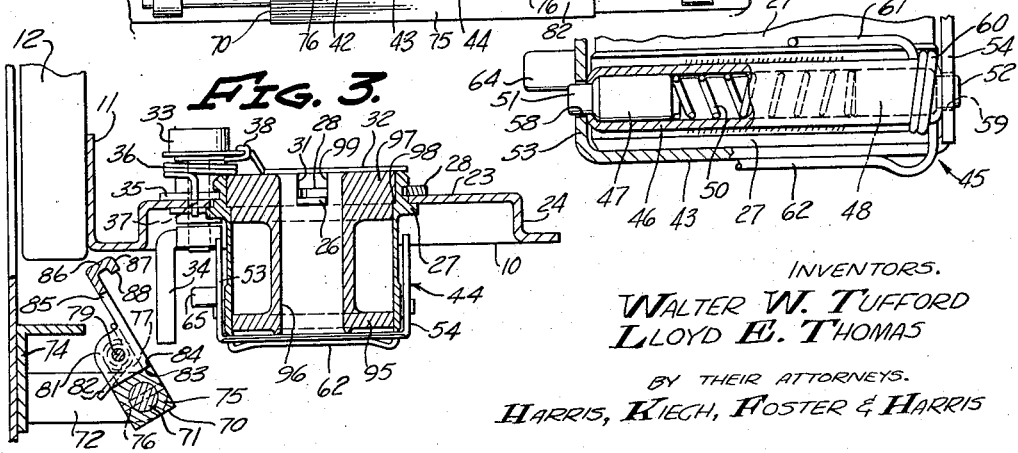
Fig. 3 is a sectional view taken along the line 3—3 of Fig. 1.
Fig. 4 is a partial sectional view taken along the line 4—4 of Fig. 2.

The bottom member 43 is mounted on a pivot structure 45 shown in detail in Fig. 4. A cylinder 46 is rigidly attached to the outside of the cup 27 by a suitable method such as welding. A pair of pivots 47, 48 are spaced within the cylinder 46 by a spring 50, the ends of the cylinder 46 being swaged over after the pivots 47—48 and the spring 50 are installed to provide a constricted opening at each end of the cylinder 46. The pivots 47, 48 have sections of reduced diameter 51, 52 extending through the respective constricted ends of the cylinder 46. The bottom member 43 has upstanding flanges 53, 54 at each end thereof, the flanges 53—54 having openings 58, 59 therein, with the reduced sections 51, 52 projecting therethrough to provide a support for the pivoting bottom member 43. A spring 60 is positioned around the cylinder 46 with a straight portion 61 resting against the cup 27 and a second straight portion 62 resting against the lower surface of the bottom member 43, the spring 60 urging the bottom member 43 to a horizontal or closed position.

A boss 64 projects outwardly from the flange 53 of the bottom member 43, and a corresponding boss 65 projects outwardly from a flange of the bottom member 44. The bottom members 43, 44 are normally in the horizontal or closed position, as seen in section in Fig. 2, due to the action of the spring 60 and a spring 67 surrounding the cylinder 46 associated with the bottom member 44. The cup 27 is emptied by applying downward forces to the bosses 64, 65, moving the bottom members 43—44 to the open position shown in phantom in Fig. 2.

An actuator assembly 70 is provided for operating both the lid 32 and the bottom members 43, 44. A shaft 71 is supported in two brackets 72, 73 which project from a frame 74 of the dispenser. The shaft 71 is rotated in the brackets 72, 73 by suitable means such as a solenoid, not shown. A block 75 is mounted on the shaft 71 by set screws 76. Brackets 77, 78 extend upwardly from the block 75 with pivot pins 79, 80 respectively mounted therein. A U-shaped lever 81 is mounted on the pivot pins 79, 80 and is urged to the position of Fig. 3 by springs 82 which are also mounted on the pivot pins 79, 80, edges 83 of the lever 81 abutting on the surface 84 of the block 75 which serves as a stop.

The lever 81 includes upstanding portions 85 and a bight portion 86. A portion of the bight 86 terminates in a flange to present a pair of mutually perpendicular contact surfaces 87, 88.

Figure 2:
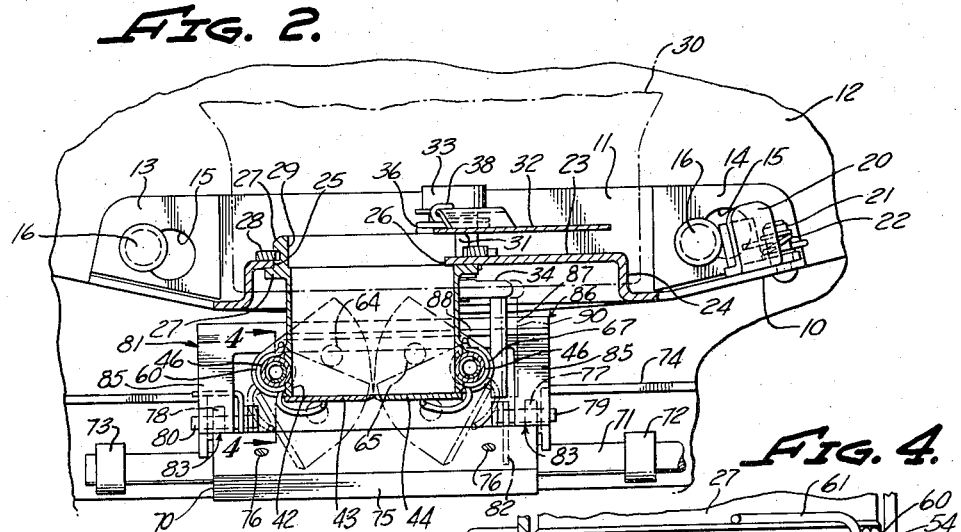
Fig. 2 is a sectional view taken along the line 2—2 of Fig. 1.

In measuring out a predetermined portion of a material, the valve is moved to the position shown in Fig. 2 with the upper opening 29 open and the lower opening 42 closed. Material from the container 30 flows through the action of gravity into the cup 27, filling it completely. Then the shaft 71 is rotated clockwise, as viewed in Fig. 3, the surface 87 of the lever 81 engaging the arm 34. Further rotation of the shaft 71 produces a rotation of the pivot post 33, moving the lid 32 over the cup 27 through the application of force from the lever 81 to the arm 34. This motion continues until the surface 87 comes into contact with the flanges 53 of the bottom members 43, 44. The position of the arm 34 at this moment is shown in phantom in Figs. 1 and 2 and indicated by the numeral 90. As the shaft 71 rotates further in the clockwise direction, the lever 81 pivots on the pivot pins 79, 80 against the urging of the springs 82, edges 83 moving away from surface 84 of block 75. As a result of the motion of the shaft 71 and the lever 81, the surface 87 slides downwardly along the flanges 53 until the surface 88 contacts the bosses 64 and 65. Continued rotation of the shaft 71 applies a downward force to the bosses 64—65 via the surface 88, forcing the bottom members 43—44 to the open position shown in phantom in Fig. 2. The contents of the cup 27 are thus discharged while the lid 32 prevents further material from flowing from the container 30 into the cup 27. At the completion of this operation, the shaft 71 rotates in the opposite direction to its original position, the bottom members 43—44 first moving to the closed position and the lid 32 then moving to the open position, allowing another charge to flow into the cup 27.

Thus, it is seen that the single actuator 70 moves the upper closure means 27 to a closed position and then moves the lower closure means 43—44 to an open position while retaining the upper closure means 27 in the closed position, thereby permitting a predetermined amount of material to be dispensed through the valve. The actual amount of material dispensed per operation can be varied by fitting a sleeve 95 (Fig. 3) within the cup 27, the volume of the central opening 96 in the sleeve 95 being varied as required. The sleeve 95 includes a section 97 of greater outside diameter than the remainder of the sleeve 95, the section 97 resting on a shoulder 98 in the cup 27, and the tongue 26 engaging a slot 99 in the sleeve 95 corresponding to the slot 31 in the cup 27. Thus, the sleeve 95 is maintained in place in the cup 27 regardless of the angular position of the wheel 12.

Although an exemplary embodiment of the invention has been disclosed and discussed, it will be understood that other applications of the invention are possible, and that the embodiment disclosed may be subjected to various changes, modifications aand substitutions without necessarily departing from the spirit of the invention.

We claim as our invention:

1. In a metering valve for a dispenser having a support member with a plurality of containers thereon, the support member being movable to position any one of the containers adjacent a discharge station, a metering valve for each container comprising: a frame adapted to be mounted on the support member, said frame including a cup having top and bottom openings therein, said cup being positioned in said frame so that said top opening is in register with an opening in one of the containers creating a passage between said cup and the containers; lid means mounted on said frame, said lid means being movable from an open position to a closed position between said cup and the container to block said passage; dump means mounted on said frame, said dump means being movable from a position closing said bottom opening in said cup to an open position releasing the contents of said cup; a control lever adapted to be rotatably mounted at said discharge station to actuate said lid means and said dump means of one of the metering valves when a respective container is positioned at said station, said lever including an actuator arm pivotally mounted on said lever, the rotation of said lever bringing said arm into engagement with said lid means to move said lid means to said closed position, additional rotation of said lever bringing said arm into engagement with said dump means to move said dump means to said open position, said arm pivoting about said lever in a direction opposite to the rotation of said lever after said lid means is in said closed position as said arm continues to rotate, said arm remaining in engagement with said lid means; and spring means engaging said lever and said arm and urging said arm to pivot about said lever in the direction that said lever rotates to actuate said lid means.

2. A metering valve as defined in claim 1, including first resilient means urging said lid means to said open position and second resilient means urging said dump means to said closed position.

3. In a metering valve, the combination of: a frame adapted to be mounted on a dispenser wheel; a cup mounted on said frame, said cup having a passage therethrough; a lid pivotally mounted on said frame, said lid being movable from an open position to a closed position to block gravity flow of material into said cup, the pivot axis of said lid being substantially parallel to the axis of said cup passage; first spring means urging said lid to said open position; bottom means pivotally mounted on said cup, said bottom means being movable from a closed position to an open position to permit gravity flow of material from said cup, the pivotal axis of said bottom means being substantially perpendicular to the axis of said cup passage; second spring means urging said bottom means to said closed position; and an actuator including a rotatable block with a stop thereon, a pivoting lever, and means urging said lever against said stop, said actuator being rotatable in a direction to cause said lever to first engage said lid and then engage said bottom means while remaining engaged with said lid, the engagement of said lever and said lid moving said lid to said closed position, the engagement of said lever and said bottom means moving said bottom meaans to said open position, said lever pivoting away from said stop when said lid moves to said closed position.

4. In a material metering valve, the combination of: a metering container having upper and lower openings therein; upper closure means mounted adjacent said container, said upper closure means being movable from an open position to a closed position blocking passage of material through said upper opening; first spring means joined to said upper closure means and normally biasing the latter to said open position; elongated shiftable structure coupled with said upper closure means for moving the latter to said closed position thereof upon shifting of said structure in one direction; lower closure means mounted adjacent said container, said lower closure means being movable from an open position to a closed position blocking passage of material through said lower opening; second spring means joined to said lower closure means and normally biasing the latter to said closed position; shiftable mechanism coupled with said lower closure for moving the latter to said open position thereof upon shifting of said mechanism in one direction; and actuating means rotatably mounted adjacent said container for rotation through a predetermined arc, said actuating means successively engaging and shifting the structure in said one direction of movement thereof to move said upper closure to the closed position thereof, remaining in engagement with said structure to maintain said upper closure means in said closed position thereof and engaging and shifting the mechanism in said one direction of movement thereof to move said lower closure means to the open position thereof as said actuating means is rotated through said predetermined arc thereof.

5. A valve as set forth in claim 4 wherein said lower closure means includes a pair of counterrotating bottom members and wherein said mechanism includes parts connected to said members and disposed in positions to be engaged by said actuating means to move said members to the open positions thereof as said actuating means is rotated and engages said parts.

6. A valve as set forth in claim 4 wherein said actuating means includes an arm rotatably mounted thereon and engageable with the structure and said mechanism, said arm pivoting in a direction opposite to the direction of rotation of said actuating means upon successive engagement of the arm with said structure and the mechanism and as said actuating means is rotated through said arc.

7. A valve as set forth in claim 6 wherein said actuating means includes a block rotatable through said arc, said arm being rotatably mounted on said block with the axis of rotation thereof disposed in spaced, parallel relationship to the axis of rotation of said block and wherein is provided yieldable means joined to said arm urging the latter in a direction opposite to the direction of pivoting thereof as the same successively engages the structure aand said mechanism.

8. A valve as set forth in claim 7 wherein said arm is provided with a pair of spaced contact surfaces for successively engaging the structure and said mechanism respectively, said yieldable means maintaining said contact surfaces in substantially fixed angular relation with the planes of movement of said structure and the mechanism as said block pivots to bring said contact surfaces into successive engagement with the structure and said mechanism.

9. A valve as set forth in claim 4 wherein said upper closure means includes a lid pivotal about a vertical axis and wherein said structure includes an L-shaped arm member having a pair of legs, one of said legs being secured to said lid and the other leg being disposed to be engaged and shifted by said actuating means as the latter is rotated through said arc thereof.

References Cited in the file of this patent

UNITED STATES PATENTS

| | | |
|---|---|---|
| 108,591 | Herbert | Oct. 25, 1870 |
| 873,176 | Schleider | Dec. 10, 1907 |
| 1,106,885 | Miller | Aug. 11, 1914 |
| 1,267,635 | Cox | May 28, 1918 |
| 1,658,257 | Rogginger | Feb. 27, 1928 |
| 2,588,206 | Clark | Mar. 4, 1952 |
| 2,622,771 | Toulou | Dec. 22, 1952 |

FOREIGN PATENTS

| | | |
|---|---|---|
| 58,513 | France | Sept. 23, 1953 |